Figures 1, 2:
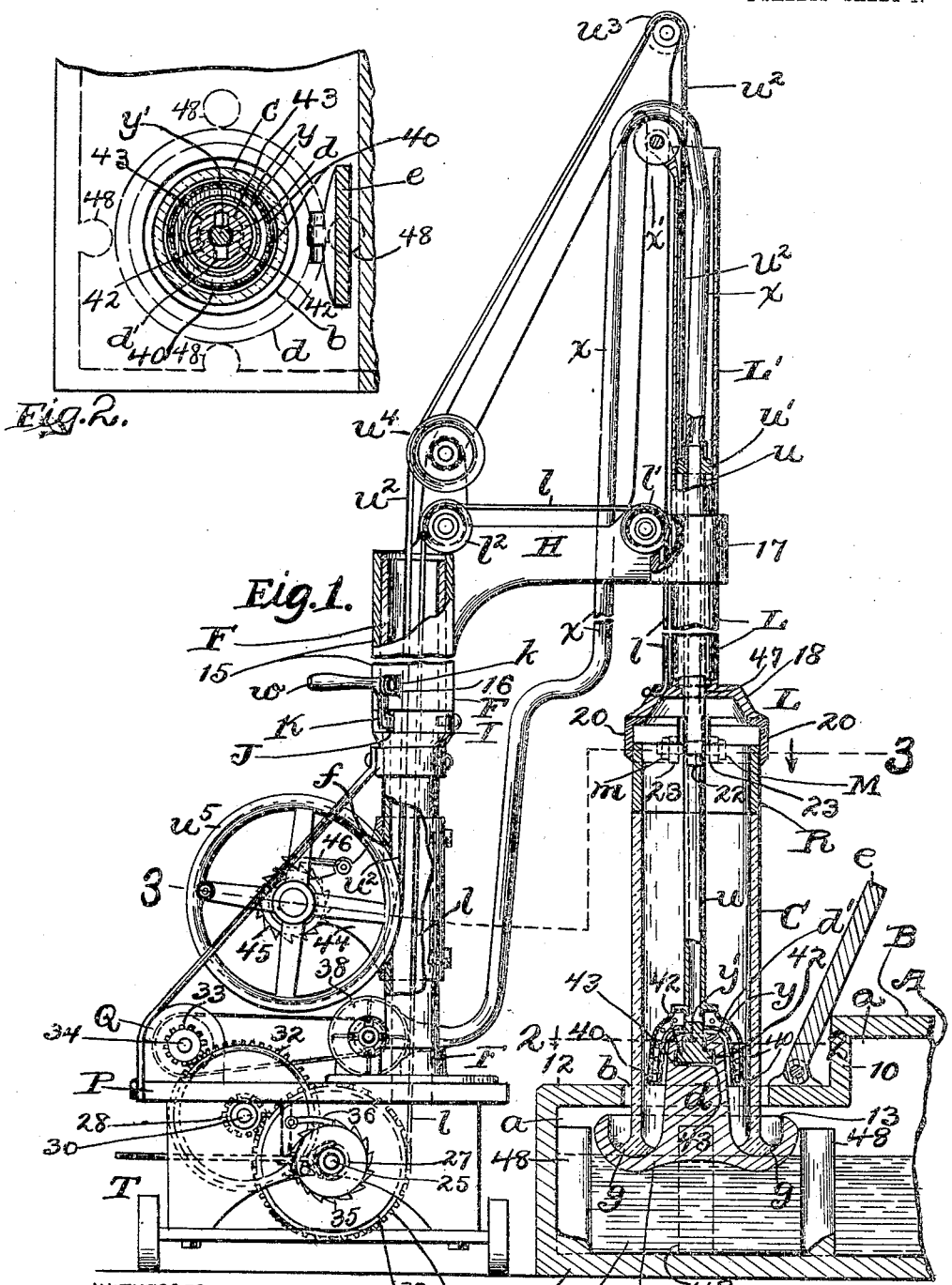

No. 792,590. PATENTED JUNE 20, 1905.
J. HALEY.
APPARATUS FOR MAKING CYLINDER GLASS.
APPLICATION FILED NOV. 16, 1903.

2 SHEETS—SHEET 1.

WITNESSES:
Daniel E. Daly.
Victor C. Lynch.

INVENTOR
Jonathan Haley
BY
Lynch & Dorer
his ATTORNEYS

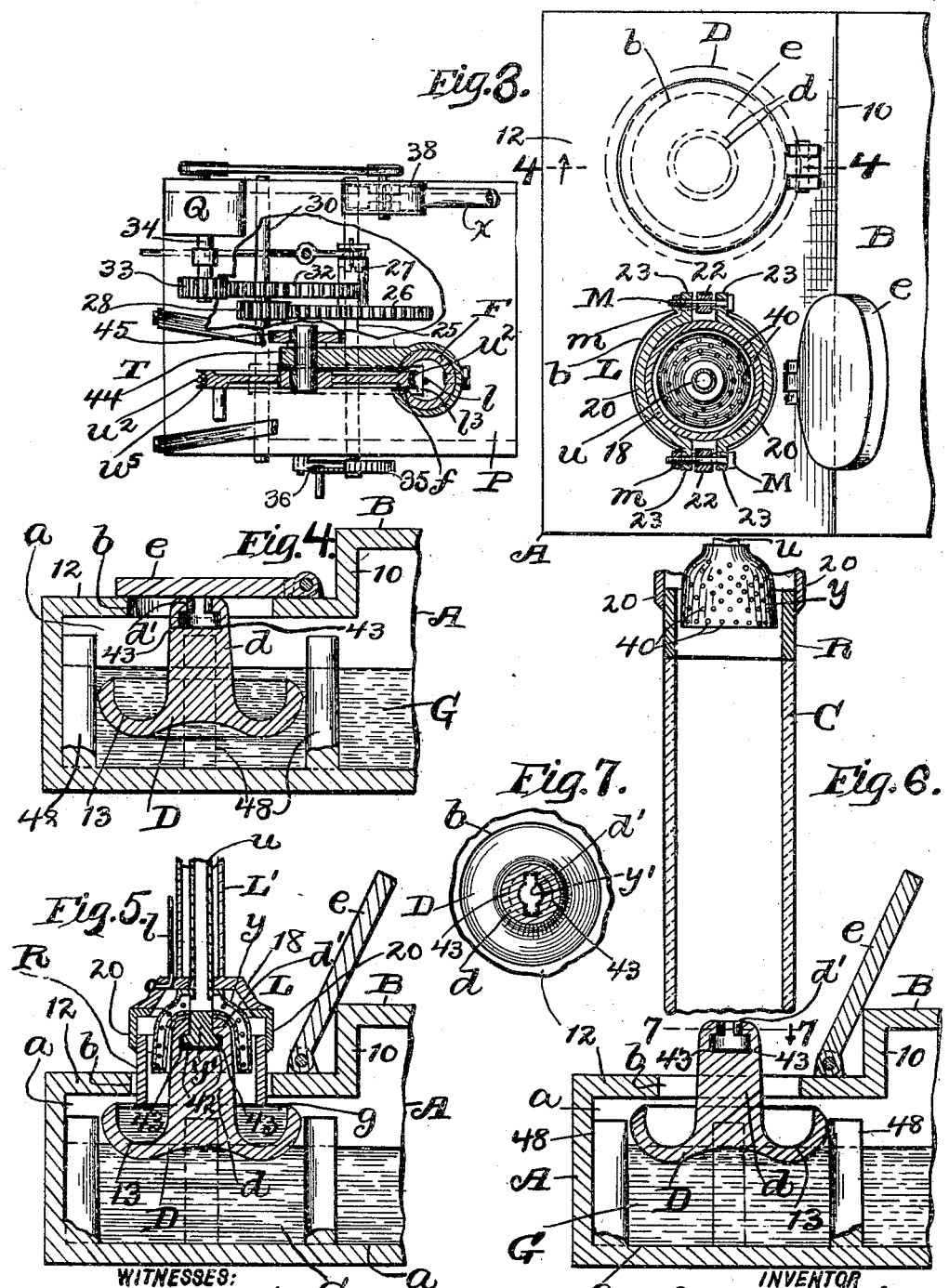

No. 792,590. Patented June 20, 1905.

UNITED STATES PATENT OFFICE.

JONATHAN HALEY, OF AKRON, OHIO, ASSIGNOR TO THE AKRON GLASS AND MACHINERY COMPANY, OF AKRON, OHIO, A CORPORATION OF OHIO.

APPARATUS FOR MAKING CYLINDER-GLASS.

SPECIFICATION forming part of Letters Patent No. 792,590, dated June 20, 1905.

Application filed November 16, 1903. Serial No. 181,333.

*To all whom it may concern:*

Be it known that I, JONATHAN HALEY, a citizen of the United States of America, residing at Akron, in the county of Summit and State of Ohio, have invented certain new and useful Improvements in Apparatus for Making Cylinder-Glass; and I hereby declare the following to be a full, clear, and exact description of the invention, such as will enable others skilled in the art to which it pertains to make and use the same.

This invention relates to improvements in apparatus for making cylinder-glass to be used for window-glass.

The primary object of this invention is to provide apparatus which is simple in construction and convenient and reliable in its operation and whereby cylinder-glass can be made or formed with great facility.

Another object of this invention is to draw a limited mass of glass-metal into the form of a cylinder which is uniform in thickness and diameter from end to end.

With these objects in view and to the end of realizing other advantages hereinafter appearing this invention consists in certain features of construction and combinations of parts hereinafter described, and pointed out in the claims.

In the accompanying drawings, Figure 1 is an elevation, largely in section, of apparatus embodying my invention, and portions are broken away in this figure to reduce the size of the drawing. Fig. 2 is a top plan in section on line 2 2, Fig. 1, illustrating a portion of the apparatus. Fig. 3 is a top plan, largely in section, on line 3 3, Fig. 1, and portions are broken away in this figure to reduce the size of the drawing and to more clearly show the construction. Fig. 4 is an elevation of a portion of the glass-metal-supply chamber, largely in vertical section, on line 4 4, Fig. 3, looking in the direction indicated by the arrow. Fig. 5 is an elevation, largely in section and corresponding with Fig. 4, except that in Fig. 5 the floating vessel is shown hoisted or elevated into its upper position and the glass-cooling means and the glass-drawing means are shown in position for operation. Fig. 6 is an elevation, largely in section and corresponding with Fig. 5, except that in Fig. 6 the glass is shown drawn from the floating vessel through the respective glass-drawing aperture of the glass-metal-supply chamber. Fig. 7 is a top plan in section on line 7 7, Fig. 6.

Referring to the drawings, A designates a tank having an interior chamber $a$, containing a body of molten glass or glass-metal G. The said body of glass-metal is kept in a suitably molten condition in any approved manner. Means for producing a body of molten glass or glass-metal and maintaining it in a suitably molten condition are too well known to require description or illustration in this application.

The chamber $a$ is the glass-metal-supply chamber of my improved apparatus. Within the said chamber are arranged two floating vessels D. The top wall B of the vessel-containing portion of the said chamber is offset downwardly, as at 10, so as to bring the lower portion 12 of the top wall of the said portion of the said chamber as closely as practicable to the body of glass-metal within the said chamber.

Each vessel D is arranged within the chamber $a$, below a circular opening or glass-drawing aperture $b$ formed in and extending vertically through the lower portion 12 of the wall B, which is provided with a lid or cover $e$ for closing the said aperture. Each vessel D is provided with a centrally-located upwardly-projecting stem $d$. Each vessel D has an annular chamber 13 formed at and extending around the lower end of the stem $d$ of the said vessel, and the opposing side walls of the said chamber slope toward each other in the direction of the bottom of the said chamber. The said chamber 13 is open at the top of the vessel all round.

A vessel D to fill the chamber 13 thereof with glass-metal is depressed or lowered into the body of glass-metal G within the chamber $a$. In Fig. 4 a vessel D is shown lowered into the said body of glass-metal G and filled with glass-metal $g$, which has flown into the vessel from the said body of glass-metal. The stem $d$ of a vessel D in the upper position of the vessel extends centrally and vertically through the respective aperture $b$, as shown in Figs. 1, 5, and 6, such a distance that the cover $e$ for the said aperture during the closing of the cover comes into engagement with the upper end of the said stem and thereupon lowers the vessel into the body of glass-metal G to the extent required to result in the flow of glass-metal from the said body into the chamber 13 of the said vessel. The desired level of molten glass or glass-metal is of course maintained within the chamber $a$.

Apparatus for drawing glass-metal from within a vessel D upwardly and vertically into the form of a cylinder is upon opening the cover $e$, which closes the aperture $b$ over the said vessel when the latter has been filled with glass-metal, brought into operation and comprises, preferably, a truck T, arranged (see Figs. 1 and 3) adjacent to and movable alongside of the vessel-containing portion of the chamber $a$, which truck has a platform P arranged in the same plane horizontally with the top wall of the vessel-containing portion of the said chamber. A standard-forming cylindrical column F, which is arranged vertically upon and secured in any approved manner to the platform P, is suitably braced from the platform. The upper end of the column F forms the pivotal bearing of a frame H, which is capable of being swung laterally and provided with a vertically-arranged journal 15, embracing the said end of the said column and seated or resting on a seat-forming collar I, with which the column is externally provided. The frame H is therefore pivotally mounted to render it capable of being swung laterally in a horizontal plane, and means for locking the said frame against swinging laterally preparatory to the drawing of glass-metal from a vessel D is provided and comprises, preferably, a latch K, which in its operative position engages a slot or recess J formed in the collar I. The latch K (see Fig. 1) is pivoted horizontally, as at $k$, a suitable distance above the lower end and at one side of the journal 15 to a bracket 16, with which the said journal is externally provided, and any suitable means—such, for instance, as a poise or weight $w$—is applied as required to retain the latch K in its operative position. The latch K is shown in its operative position in Fig. 1 and obviously is rendered inoperative by swinging it out of engagement with the slot J against the action of the weight $w$, and the frame H is rendered free to be laterally swung circumferentially of the column F by rendering the said latch inoperative.

The frame H extends laterally of and a suitable distance above the column F. The frame H is provided at one side and a suitable distance from the journal 15 with a vertically-arranged cylindrical guide 17, which loosely embraces and affords lateral bearing to the correspondingly-arranged cylindrical and tubular shank or stem L' of a chuck or holder L, arranged below the said guide and employed in supporting the ring or annular tool R, employed in drawing glass-metal from within a vessel D upwardly into the form of a cylinder C, as shown in Fig. 1. The stem L' is rigid with the inverted-dish-shaped body portion 18 of the holder L. The body portion 18 (see Figs. 1 and 3) is provided at its lower end with two oppositely-arranged coöperating jaws 20, embracing opposite sides, respectively, of the ring R at the upper end of the ring. The jaws 20 are adjustable toward and from each other. The body portion 18 of the holder L is provided with two parallel slideway-forming bolts M, arranged horizontally at opposite sides, respectively, of the said body portion and arranged parallel with the line of adjustment of the said jaws. Each bolt M extends through a correspondingly-arranged ear 22, formed upon the body portion 18, and through two correspondingly-arranged ears 23, formed upon the different jaws, respectively, at opposite sides, respectively, of the said ear. The bolts M are arranged with their heads at the outer sides of the ears 23 of one of the jaws 20, and nuts $m$ are mounted on the shanks of the bolts at the outer sides of the other of the said jaws. The bolts M and nuts $m$ coöperate in securing the jaws 20 in the desired adjustment, and the ring R is tightly clamped by and between the said jaws or rendered free to be removed according as the nuts are tightened or loosened.

The holder L is suspended from a cable $l$, which is attached at one end to the body portion 18 of the said holder in any approved manner. The cable $l$ leads upwardly from the holder L exteriorly of and along the stem L' to and over a vertically-arranged guide-sheave $l'$, supported from the framework H adjacent to the guide 17, thence leads laterally to and over another vertically-arranged guide-sheave $l^2$, supported from the frame H adjacent the upper end of the journal 15, and thence leads downwardly into and through the column F to and in under and operatively engages a winding-drum $l^3$, which is operatively mounted on a horizontally-arranged shaft 25, supported from the truck T. A spur-gear 26 is loosely mounted on the shaft 25, and a clutch 27 is provided for establishing and interrupting operative connection between the said gear and the said shaft. The gear 26 meshes with a pinion 28, operatively mounted on a shaft 30, which is arranged horizontally and parallelly with the shaft 25 and supported from the truck T. The shaft 30 is operatively provided with a spur-gear 32, which meshes with a pinion 33, operatively mounted on the shaft 34 of an engine or motor Q on the truck T. It will be observed, therefore, that operative connection between the drum $l$ and the engine or motor is controlled by the clutch 27. Power is transmitted to the drum-bearing shaft 25 from the engine or motor Q to hoist the holder Q and the connected glass-drawing ring or tool R.

The drum-bearing shaft 25 is operatively provided with a ratchet-wheel 35, and a pawl 36, which is pivotally supported from the framework of the truck T, engages the said wheel. The ratchet-wheel 35 and pawl 36 are arranged as required to prevent the rotation of the drum $l^3$ in the direction required to pay out the cable engaging the drum. The drum $l^3$ is rendered free to pay out the said cable upon disengaging the pawl 36 from the wheel 35.

By the construction hereinbefore described it is obvious that the holder L and the glass-drawing ring or tool R, carried thereby, lower by gravity and are hoisted by power transmitted from the engine or motor. I would here remark that the ring R is of metal and that glass-metal will readily adhere to the lower end of the said ring when the latter at the said end becomes suitably heated, which it does upon being lowered into contact with the glass-metal to be drawn from a vessel D.

A pipe $u$, which is shiftable endwise, is arranged vertically and centrally of the stem L' of the holder L. The pipe $u$ extends a suitable distance below the stem L', and a hose or flexible tube $x$ is attached in any approved manner at one end to the upper end of and communicates with the pipe $u$ and at the opposite end communicates with the outlet of a rotary fan or blower 38, which is operatively connected in any approved manner with the engine or motor Q. The pipe $u$ is provided within the stem L' with a slide-forming collar $u'$. It will be observed, therefore, that the stem L' forms a vertically-arranged slideway for the slide $u'$ and that the pipe $u$ depends from the said slide and at the slide communicates with and is attached to the flexible tube $x$. The tube $x$ leads over a guide-sheave $x'$, supported from the upper end of the stem L'.

The blower or fan 38 is mounted on the truck T and communicates at its inlet with the external atmosphere. Obviously the operation of the fan or blower 38 results in the passage of air through the connected hose or tube $x$ into the pipe $u$ and thence into and through the inverted-cup-shaped nozzle $y$, with which the said pipe at its lower end is provided. The nozzle $y$ has the shape and dimensions required to render it capable in its lower portion of embracing the upper portion of the stem $d$ of a vessel D. The nozzle $y$ is provided with laterally outwardly discharging orifices 40, some of which are located at and at short intervals circumferentially of the lower and transversely larger end of the nozzle, which is cylindrical at the said end. The nozzle $y$ (see Figs. 1, 2, and 5) is provided centrally with a depending stem $y'$, upon the lower end whereof are formed two laterally-projecting members 42, arranged at opposite sides, respectively, of the stem. The said stem $y'$ is adapted to engage a hole $d'$, formed in and centrally of the upper end of the stem $d$ of a vessel D, which hole is just large enough at its upper end to accommodate the reception thereby of the said stem and its projecting members 42, but is undercut at its lower end and at opposite sides, as at 43, to accommodate the turning of the said stem half-way round when the said stem is lowered into the said hole. In dotted lines, Fig. 7, the stem $y'$ is shown in position to enter the aforesaid hole $d'$, and obviously the turning of the nozzle $y$ half-way round when its stem $y'$ has been lowered into the said hole $d'$ will bring the projecting members 42 of the said stem into the lateral enlargements of the lower end of the said hole, and thereby attach the vessel to the nozzle, as shown in Fig. 5.

A cable $u^2$, employed in hoisting and lowering the pipe $u$ and attachment or attachments, is provided and operatively attached at one end in any approved manner to the said pipe at the upper end of the pipe adjacent the discharging end of the tube $x$. The cable $u^2$ leads from the pipe $u$ upwardly to and over a vertically-arranged guide-sheave $u^3$, supported from the frame H at the upper end of the said frame, thence downwardly into engagement with a vertically-arranged guide-sheave $u^4$, supported from the said frame above and near the sheave $l^2$, and thence downwardly into the column F, and thence laterally through a lateral aperture $f$, with which the said column is provided, into engagement with a winding drum or wheel $u^5$, which is supported from a bracket 44, with which the said column is provided externally at one side of the said aperture. A ratchet-wheel 45 is operatively connected with the drum or wheel $u^5$ and arranged with its axis coincident with the axis of the said drum or wheel $u^5$. A pawl 46, which is pivotally supported from the bracket 44, engages the ratchet-wheel 45. The ratchet-wheel 45 and pawl 46 are arranged to prevent rotation of the drum or wheel $u^5$ in the direction required to pay out the cable $u^2$. The drum or wheel $u^5$ is free to turn in the direction required to wind up the engaging cable and is rendered free to pay out the said cable upon disengaging the pawl 46 from the ratchet-wheel 45. Obviously the pipe $u$ and attachment or attachments lower by gravity when the drum or wheel $u^5$ is paying out the cable $u^2$ and are hoisted by winding up the said cable.

It will be observed that by the construction and arrangement of parts hereinbefore described the glass-drawing ring or tool R and the nozzle $y$ are readily brought into the proper position relative to the glass-drawing aperture $b$, through which glass-metal is to be drawn. It is obvious, of course, that the frame H is so adjusted relative to the said aperture as to bring the glass-drawing tool R directly into line vertically with the said aperture, and obviously when the said tool is arranged as required relative to the said aperture the pipe *u* and attached nozzle, which pipe has lateral bearing in the body portion 18 of the holder L, as at 47, Fig. 1, will be arranged as required relative to the said aperture. The vessel D, located in under the said aperture, has such dimensions and arrangement relative to the said aperture and relative to the diameter of the glass-drawing ring R that the chamber 13 of the said vessel, although arranged in the main in under the said aperture, has its outer portion extending in under the portion 12 of the wall B, and glass is drawn from the said chamber all round the stem *d* of the said vessel centrally between the side walls of the said chamber.

Each vessel D is guided vertically by stationary vertically-arranged posts 48, provided within the chamber *a* at suitable intervals around and in close proximity to the vessel.

In Fig. 3 one of the glass-drawing apertures *b* is shown closed and the other open. In Fig. 5 the glass-drawing ring R is shown lowered into an open aperture *b* and into contact with the mass of glass-metal *g* within the vessel D in under the said aperture, and the pipe *u* and attached nozzle *y* are shown lowered, and the said vessel is shown attached to the said nozzle and elevated far enough to interrupt communication between the body of glass-metal G exteriorly of the said vessel and the glass-metal *g* in the said vessel. In Fig. 1 cylinder-glass C is shown being drawn from a vessel D, and in Fig. 6 the said vessel is shown empty and detached from the nozzle *y* and the cylinder-glass drawn from the vessel and the pipe *u* and attached nozzle *y* are elevated far enough to accommodate the removal of the cylinder-glass C from the stem *d'* of the said vessel.

In the operation of my improved apparatus glass-metal is drawn through the different apertures *b* alternately, and the cover which closes the aperture *b* through which glass is next to be drawn and which in its closed position holds the vessel D arranged in under the said aperture in its immersed or lower position, is opened, whereupon the pipe *u* is lowered to bring the depending stem *y'* of the nozzle *y* into line with the hole *d'*, formed in the stem *d* of the said vessel. The said nozzle is then given a half-turn to effect the attachment of the respective vessel D to the nozzle-stem *y'*, whereupon the pipe *u* is hoisted to lift the filled vessel above the level of the body of glass-metal G within the chamber *a*, as shown in Fig. 5. The glass-drawing ring R is then lowered, if not already lowered, but may be lowered simultaneously with the lowering of the pipe *u* far enough to bring the said ring into engagement with the glass-metal in the lifted vessel D, whereupon the said ring is hoisted gradually to form cylinder-glass, as shown in Figs. 1 and 6, and while cylinder-glass is being drawn the fan or blower 38 is operated to supply air to the nozzle *y* for use in cooling the said glass, but not under pressure sufficient to injure the glass.

I would here remark that the drawing of glass-metal from an annular chamber 13 of a vessel D centrally between the downwardly-converging side walls of the said chamber is invaluable in the formation with facility of cylinder-glass which is uniform in thickness and diameter from end to end of the cylinder. The provision of the inverted-cup-shaped nozzle *y* at the lower end of the pipe *u* and adapted to embrace the upper end of the stem *d* of a vessel D is also of great importance. The said nozzle at its lower end is not quite as large transversely as the cylinder of glass to be drawn, so as not to come in contact with the said cylinder. Some of the orifices of the nozzle are located so that air is discharged in close proximity to the surrounding wall of the interior chamber of the cylinder and at or in close proximity to the upper end of the aperture *b*, through which the glass is being drawn, so that the glass drawn in the formation of the said cylinder is immediately or approximately immediately cooled and solidified upon drawing it through the said aperture. The suspension of the ring-holder L and the pipe *u* from a frame which is capable of being swung laterally is also not unimportant, because thereby the said pipe and the glass-drawing ring R can be simultaneously swung to and over or from over a glass-drawing aperture *b*. Also the holder L, being inverted-cup shaped, accommodates the hoisting of the nozzle *y* into and above the lower end of the ring R to facilitate the removal of a cylinder of glass drawn by the said ring. In Fig. 6 the nozzle *y* is shown hoisted above the lower end of the ring R, and obviously the cylinder-glass shown in the said figure and elevated far enough to free the stem *d* of the respective vessel D can be swung laterally to accommodate the closing of the cover for the aperture *b*, through which the said cylinder has been drawn, whereupon the cover over the other aperture *b* is opened for the purpose of drawing glass therethrough. As already indicated, the rendering of the latch K inoperative accommodates the lateral swinging of the frame H when necessary, and the mounting of the said frame upon a truck facilitates the movement of the glass-drawing apparatus and pipe-shifting apparatus alongside of the glass-metal-supply chamber *a*.

What I claim is—

1. Apparatus for making cylinder-glass, comprising a glass-metal-supply chamber having a top wall provided with an aperture extending vertically through the wall; a floating vessel contained within the said chamber below the said aperture and provided with a centrally-located upwardly-projecting stem, which vessel has an annular chamber at and surrounding the lower end of the stem, which chamber is open at the top and has its side walls sloping toward each other in the direction of its bottom; means for hoisting the said vessel from its lower position into its upper position; means for actuating the vessel from its upper into its lower position; means for drawing glass in the form of a cylinder from within the aforesaid annular chamber, and means for cooling the said cylinder interiorly in close proximity to the glass-metal-supply chamber, and the said vessel and the aforesaid aperture and glass-drawing means having such relative arrangement that the cylinder of glass is, during the glass-drawing operation, drawn centrally between the opposing side walls of the aforesaid annular chamber upwardly through the outer portion of the aforesaid aperture.

2. Cylinder-glass-making apparatus, comprising a glass-metal-supply chamber having a top wall provided with an aperture extending vertically through the wall; a cover for closing the said aperture; a vertically-movable floating vessel contained within the said chamber below the said aperture and provided with a centrally-located upwardly-projecting stem arranged to extend upwardly through and above the aforesaid aperture in the upper position of the vessel when the aforesaid cover is open, which vessel has an annular chamber at and surrounding the lower end of the aforesaid stem, which chamber is open at the top and has its side walls sloping toward each other in the direction of the bottom; means for holding the vessel in its upper position; means for drawing glass in the form of a cylinder from within the aforesaid annular chamber, and means for cooling the cylinder of glass from within the chamber interiorly of the cylinder in close proximity to the glass-metal-supply chamber, and the said vessel and the aforesaid aperture and glass-drawing means having such relative dimensions and arrangement that the glass cylinder is, during the glass-drawing operation, drawn from a point centrally between the opposing side walls of the aforesaid annular chamber upwardly through the outer portion of the aforesaid aperture.

3. Cylinder-glass-making apparatus, comprising a glass-metal-supply chamber having a top wall provided with an aperture extending vertically through the wall; a cover for closing the said aperture; a floating vessel contained within the said chamber below the said aperture and provided with a centrally-located upwardly-projecting stem, which vessel has an annular chamber at and surrounding the lower end of the stem, which chamber is open at the top and has its side walls sloping toward each other in the direction of its bottom; means for hoisting the said vessel from its lower into its upper position; means for drawing glass in the form of a cylinder from within the aforesaid annular chamber, and means for cooling the said cylinder interiorly at the upper end of the aperture.

4. Cylinder-glass-making apparatus, comprising a glass-metal-supply chamber having a top wall provided with an aperture extending vertically through the wall; a floating vessel contained within the said chamber below the said aperture and provided with a centrally-located upwardly-projecting stem, which vessel has an annular chamber at and surrounding the lower end of the said stem and open at the top; means for hoisting the said vessel from its lower into its upper position; means for actuating the said vessel from its upper into its lower position; means for drawing glass in the form of a cylinder from within the aforesaid annular chamber, and means for conducting air into the said cylinder in close proximity to the glass-metal-supply chamber during the glass-drawing operation.

5. Cylinder-glass-making apparatus, comprising a glass-metal-supply chamber having a top wall provided with an aperture extending vertically through the wall; a cover for closing the said aperture; a floating vessel contained and movable vertically within the said chamber below the said aperture and provided with a centrally-located upwardly-projecting stem arranged to extend upwardly through and above the aforesaid aperture in the upper position of the vessel when the aforesaid cover is open, which vessel has an annular chamber at and surrounding the lower end of the aforesaid stem, which chamber is open at the top; means for holding the said vessel in its upper position, and means for drawing glass in the form of a cylinder from within the aforesaid annular chamber, and means for discharging air within the said cylinder at suitable intervals circumferentially of and in suitable proximity to the surrounding wall of the cylinder and at an elevation above but in close proximity to the glass-metal-supply chamber.

6. Cylinder-glass-making apparatus, comprising a glass-metal-supply chamber having a top wall provided with an aperture extending vertically through the wall; a floating vessel contained and vertically movable within the said chamber below the said aperture and provided with a centrally-located upwardly-projecting stem, which vessel has an annular chamber at and surrounding the lower end of the said stem, which chamber is open at the top; means for holding the said vessel in its upper position; means for drawing glass in the form of a cylinder from within the aforesaid annular chamber; an inverted-cup-shaped nozzle adapted to embrace the upper portion of the aforesaid stem, and means for supplying air to the said nozzle during the glass-drawing operation.

7. Cylinder-glass-making apparatus, comprising a glass-metal-supply chamber having a top wall provided with an aperture extending vertically through the wall; a vertically-movable floating vessel contained within the said chamber below the said aperture and provided with a centrally-located upwardly-projecting stem, which vessel has an annular chamber at and surrounding the lower end of the said stem, which chamber is open at the top; means for holding the said vessel in its upper position; means for drawing glass in the form of a cylinder from within the aforesaid annular chamber; an inverted-cup-shaped nozzle adapted to embrace the upper portion of the aforesaid stem and having laterally and outwardly discharging orifices; means for supplying air to the said nozzle during the glass-drawing operation, and means for removably attaching the nozzle to the aforesaid stem.

8. Cylinder-glass-making apparatus, comprising a glass-metal-supply chamber having a top wall provided with an aperture extending vertically through the wall; a floating vessel contained and vertically movable within the said chamber below the said aperture and provided with a centrally-located upwardly-projecting stem, which vessel has an annular chamber at and surrounding the lower end of the said stem, which chamber is open at the top; means for holding the said vessel in its upper position; means for drawing glass in the form of a cylinder from within the aforesaid annular chamber; a nozzle shaped and arranged to render it capable of embracing the upper portion of the aforesaid stem, and means for supplying air to the said nozzle during the glass-drawing operation.

9. The combination, with a vessel from which glass-metal is to be drawn, which vessel is provided with a centrally-located upwardly-projecting stem and has an annular chamber at and surrounding the lower end of the said stem, which chamber is open at the top, of means for drawing glass in the form of a cylinder from within the said chamber; an inverted-cup-shaped nozzle arranged to embrace the upper portion of the aforesaid stem; an upright endwise-shiftable pipe connected and communicating with and extending upwardly from the said nozzle; means for shifting the said pipe vertically, and means for supplying air or any aeriform cooling agent to the said pipe.

10. The combination, with a vessel from which glass is to be drawn, which vessel has an annular chamber open at the top, of means for drawing glass in the form of a cylinder from within the said chamber; an upright vertically-shiftable pipe provided, at its lower end, with a nozzle adapted to discharge into the said cylinder; means for guiding the pipe; means for discharging air or the like into the said pipe; means for shifting the pipe vertically, and means whereby the said pipe and the glass-drawing means can be swung laterally simultaneously.

11. The combination, with a vessel from which glass-metal is to be drawn into the form of a cylinder, of an annular glass-drawing tool; a vertically-movable holder for the said tool, which holder is provided with an upwardly-projecting vertically-arranged stem; means for guiding the said stem; means for shifting the said holder vertically; an upright vertically-shiftable pipe extending through the aforesaid holder and provided, at its lower end, with a nozzle adapted to discharge into the glass cylinder; means for discharging air or the like into the said pipe; means for shifting the pipe vertically, and means whereby the said pipe and the glass-drawing tool can be moved laterally simultaneously.

12. In combination, a frame pivotally mounted to render it capable of being swung laterally; a vertically-arranged glass-drawing tool; a vertically-movable holder for the said tool, which holder is provided with an upwardly-projecting vertically-arranged stem; means on the frame for guiding the said stem; means for shifting the said holder vertically and comprising a cable operatively connected with the holder; guide-sheaves supported from the frame and engaging the cable, and a cable-winding device operatively engaging the cable.

13. In combination, a truck; a hollow column mounted on the truck; a frame vertically journaled on the upper end of the column; a vertically-arranged glass-drawing tool; a vertically-movable holder for the said tool, which holder is provided with an upwardly-projecting vertically-arranged stem; means on the aforesaid frame for guiding the said stem; means for shifting the said holder vertically and comprising a suitably-guided cable extending through the aforesaid column, and a cable-winding device engaging the cable and supported from the truck.

14. In combination, a truck; a hollow column mounted on the truck and provided externally with a seat; a laterally-swingable frame journaled on the upper end of the column and resting upon the said seat; a vertically-arranged glass-drawing tool; a vertically-movable holder for the said tool, which holder is provided with an upwardly-projecting vertically-arranged stem; means on the aforesaid frame for guiding the said stem; means for shifting the said holder vertically and comprising a cable extending through the aforesaid column; a cable-winding device engaging the cable and supported from the truck, and guide-sheaves engaging the cable between the upper end of the column and the aforesaid holder.

15. In combination, a truck; a hollow column mounted on the truck and provided with a collar having a recess; a frame pivotally mounted on the truck to render it capable of being swung laterally; a latch carried by the frame and adapted to engage the aforesaid recess; a vertically-arranged glass-drawing tool; a vertically-movable holder for the said tool; means for guiding the said holder; means for shifting the said holder vertically and comprising a cable extending into and longitudinally of and through the aforesaid column; a cable-winding device engaging the cable and mounted on the truck, and guide-sheaves engaging the cable and supported from the aforesaid frame.

16. In combination, a pivotally-mounted frame; an annular vertically-arranged glass-drawing tool; a vertically-movable holder for the said tool, which holder is provided with an upwardly-projecting vertically-arranged tubular stem; means on the aforesaid frame for guiding the said stem; means for shifting the said holder vertically; an upright vertically-shiftable pipe arranged within and longitudinally of the aforesaid stem and extending through the aforesaid holder; means for discharging air or the like into the said pipe, and means for shifting the pipe vertically and comprising a suitably-guided and suitably-actuated cable operatively connected with the pipe.

17. In combination, a truck; a hollow column mounted on the truck and provided with a lateral aperture; a frame journaled vertically on the upper end of the column, an annular vertically-arranged glass-drawing tool; a vertically-movable holder for the said tool; means for guiding the said holder; means for shifting the said holder vertically; an upright vertically-shiftable pipe extending vertically through the aforesaid holder and provided, at its lower end, with a nozzle adapted to discharge into the cylinder of glass to be drawn; means for discharging air or the like into the said pipe; means for guiding the pipe; a cable operatively connected with the pipe and extending into and longitudinally of the column and through the aforesaid aperture; a cable-winding device engaging the said cable, and guide-sheaves supported from the aforesaid frame and engaging the said cable.

18. In combination, a hollow column provided with a lateral aperture; a frame journaled vertically on the upper end of the column; means for locking the frame to the column; an annular vertically-arranged glass-drawing tool; a vertically-movable holder for the said tool; means for guiding the said holder; means for shifting the said holder vertically; an upright vertically-shiftable pipe extending vertically through the aforesaid holder and arranged to conduct air or the like to the cylinder of glass to be drawn by the aforesaid glass-drawing tool; means for discharging air or the like into the said pipe; a suitably-guided cable operatively connected with the pipe and extending into and longitudinally of the column and through the aforesaid aperture, and a cable-winding device supported from the column and engaging the cable.

19. In combination, a column; a frame journaled vertically on the upper end of the column; means for locking the frame to the column; an annular vertically-arranged glass-drawing tool; a vertically-movable holder for the said tool; means for guiding the said holder; means for shifting the said holder vertically; an upright vertically-shiftable pipe extending vertically through the aforesaid holder and arranged to conduct air or the like to the cylinder of glass to be drawn by the aforesaid glass-drawing tool, and means for moving the said pipe vertically.

20. In combination, an annular vertically-arranged glass-drawing tool; a vertically-movable holder for the said tool; means for guiding the said holder; means for shifting the said holder vertically; an upright vertically-shiftable pipe extending vertically through the aforesaid holder and provided, at its lower end, with a nozzle adapted to discharge into the cylinder of glass to be drawn; means for discharging air or the like into the said pipe; means for guiding the pipe, and means for actuating the pipe vertically.

21. In combination, a pivotally-mounted frame; an annular vertically-arranged glass-drawing tool; a vertically-movable holder for the said tool, which holder is provided with an upwardly-projecting vertically-arranged tubular stem; means on the aforesaid frame for guiding the said stem; means for shifting the said holder vertically; an upright vertically-shiftable pipe arranged within and longitudinally of the aforesaid stem and extending through the aforesaid holder; means for discharging air or the like into the said pipe, and means for shifting the pipe vertically.

22. In combination, a frame pivotally mounted on the truck to render it capable of being swung laterally; means for locking the frame against swinging laterally; a vertically-arranged glass-drawing tool; a vertically-movable holder for the said tool; means for guiding the said holder, and means for shifting the said holder vertically.

23. In combination, a laterally-swingable frame; a vertically-arranged glass-drawing tool; a vertically-movable holder for the said tool, which holder is provided with an upwardly-projecting vertically-arranged stem; means on the aforesaid frame for guiding the said stem, and means for shifting the said holder vertically.

24. Cylinder-glass-making apparatus, comprising a glass-metal-supply chamber having a top wall provided with an aperture extending vertically through the wall; a cover for closing the said aperture; a floating vessel contained and movable vertically within the said chamber below the said aperture, which vessel is open at the top; means for holding the said vessel in its upper position; means for drawing glass in the form of a cylinder from within the aforesaid annular chamber, and means for discharging air within the said cylinder at suitable intervals circumferentially of and in suitable proximity to the surrounding wall of the cylinder and at an elevation above but in close proximity to the glass-metal-supply chamber.

25. Cylinder-glass-making apparatus, comprising a glass-metal-supply chamber having a top wall provided with an aperture extending vertically through the wall; a floating vessel contained within the said chamber below the said aperture and open at the top; means for hoisting the said vessel from its lower into its upper position; means for actuating the said vessel from its upper into its lower position; means for drawing glass in the form of a cylinder from within the aforesaid annular chamber, and means for discharging air within the said cylinder in close proximity to the glass-metal-supply chamber during the glass-drawing operation.

In testimony whereof I sign the foregoing specification in the presence of two witnesses.

JONATHAN HALEY.

Witnesses:
C. H. DORER,
G. M. HAYES.